April 17, 1956 V. C. HEYBOURNE 2,742,043

CARD STOP FOR VISIBLE CARD INDEX PANELS

Filed July 20, 1953

INVENTOR
VICTOR C. HEYBOURNE
George V. Eltgroth
BY Roland T. Booth
ATTORNEYS 2,742,043

CARD STOP FOR VISIBLE CARD INDEX PANELS

Victor C. Heybourne, Tonawanda, N. Y., assignor, by mesne assignments, to Sperry Rand Corporation, New York, N. Y., a corporation of Delaware Application July 20, 1953, Serial No. 368,963

1 Claim. (Cl. 129—16)

This invention relates to visible card indexes and particular to indexes of the type composed of a plurality of offset, overlapping, interengaged cards, slidably mounted on flanged runways.

The invention provides a card stop and aligning clamp that is applied to the top and bottom of a column of offset, overlapped index cards to secure them in a desired position on the runway and preserve the proper spacing and alignment.

The invention further provides a stop for this purpose of simple, inexpensive construction, that is reversible for use at either the top or bottom of a card column, and that is easily applied and removed.

Figure 1:
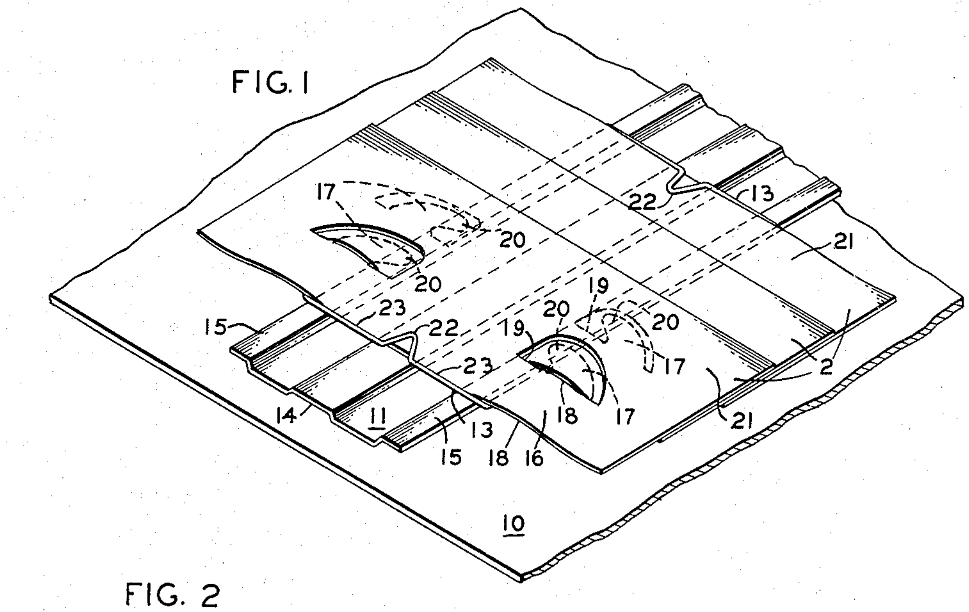
Fig. 1 is a fragmentary perspective of a plurality of visible index cards on a portion of a runway showing the card stop forming the invention in place at each end of the group.
Figure 2:
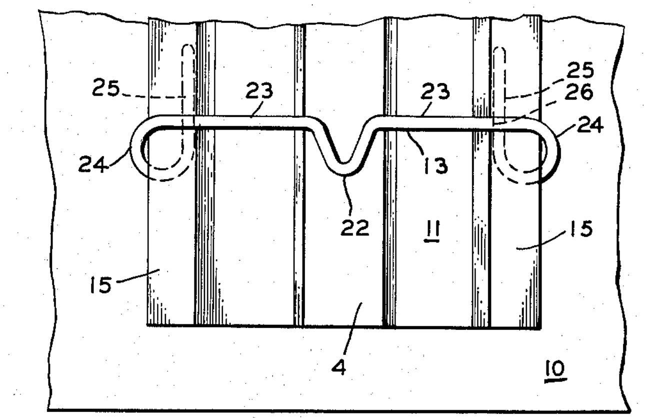
Fig. 2 is a fragmentary plan view of a portion of a runway with the card stop in place.

Card indexes of the type to which this invention relates have long been used in the preparation of lists and directories where frequent changes must be made, such as master telephone directories or customer listings for utilities and for parts lists and catalogs.

The individual cards for use in such indexes are long, narrow and rectangular. Reference matter is recorded on the upper margin of the card only, usually in a single line. The lower portion of the card is die-cut to form a pair of attaching tongues interengaging with the lower edge of a preceding card and each having an inwardly directed ear which engages under a flange of the runway, slidably retaining the cards on the runway. The die-cuts have edge portions parallel to the lower edge of the card and the cards are carefully made to ensure this parallelism. The cards are typed in a holding fixture mounted on a typewriter which accurately aligns the typing in a parallel relation to the lower edge of the card. It can readily be seen that when two or more cards are interengaged with the lower edge of each succeeding card engaged between the attaching tongues of the preceding card and its body and abutting against the lower edges of the die-cuts, that all the lines of typing will be parallel.

Such indexes are frequently used in the preparation of printed directories and catalogs made by one of the photographic reproduction processes. In order to produce a result comparable in appearance to that produced by a page set in type, it is essential that the spacing and alignment of the cards be very accurate, as any variations stand out strikingly on the finished page. Unless some means is provided to secure the cards in the proper relationship to each other, their spacing and alignment can easily be disturbed. The subject invention aligns the cards in the proper perpendicular relationship to the runway and clamps them together in internested, parallel, offset, overlapping relation.

Examples of the cards, mounting means, operating techniques and manufacture are described, for example, in prior U. S. Patents Nos.:

1,048,056; Dec. 24, 1912
1,048,058; Dec. 24, 1912
1,628,124; May 10, 1927
1,675,331; July 3, 1928
1,820,889; Aug. 25, 1931
1,945,843; Feb. 16, 1932
1,903,206; Mar. 28, 1933
1,925,343; Sept. 5, 1933
2,081,841; May 25, 1937
2,635,607; Apr. 21, 1953

The invention is adapted for use on runways and runway mounting panels such as those shown in Patent No. 2,635,607. A supporting panel 10 carries card-holding runway 11 mounting a plurality of cards 12. Cards 12 are retained in position on runway 11 by card stops 13 engaging the top and bottom cards. Runway 11 is formed with a central longitudinal rib 14 and offset marginal flanges 15. Cards 12 have a lower marginal portion 16 formed with a pair of die-cut attaching lugs 17. The lower marginal portion of one card engages between the rear face of the next overlying card and lugs 17 thereon. The lower edge 18 of marginal portion 16 abuts against edges 19 of the die-cuts forming lugs 17. Edges 19 of each card 12 are parallel to the lower edge 18 of margin 16. The free ends of lugs 17 have inwardly directed ears 20 which engage under flanges 15 of runway 11, slidably securing cards 12 to runway 11. The upper margin 21 of each card 12 is visible above the upper margin of an adjacent overlying card 12 while the lower margin 16 is interengaged between lugs 17 and margin 16 of the overlying card as previously described to retain the cards in a predetermined offset relation.

Figure 3:
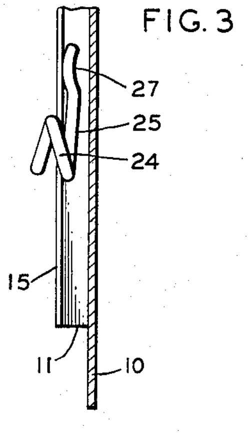
Fig. 3 is a side elevation of the card stop as shown in Fig. 2.
Figure 4:
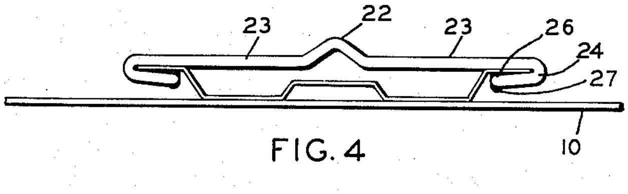
Fig. 4 is an end elevation of the card stop as shown in Fig. 2.

Card stops 13 engage the last card at each end of a column. They are preferably made of a single piece of light spring wire, but other material may be used or they may be assembled by any conventional means from separate parts or stampings. Stops 13 each have a V-shaped card retaining nose 22 centrally disposed between aligning bars 23. Nose 22 is inclined slightly to the plane of the panel for ease in sliding it over a card 12. Loops 24 are formed at the outer ends of bars 23 and clamping arms 25 extend substantially at right angles to bars 23 from loops 24 to engage the undersides of marginal flanges 15. Arms 25 are formed with loops 24 to be under spring tension with respect to bars 23 at the points 26 where arms 25 cross under bars 23, and therefore serve to frictionally clamp stops 13 on runway 11 by the spring tension of bars 23 and arms 25 acting on the upper and lower surfaces of marginal flanges 15. The terminals of arms 25 are preferably formed with a slightly curved portion 27, as seen in Fig. 3, to slide on the underside of flanges 15 and prevent the terminal portions of arms 25 from scoring or marring the surface of flanges 15.

As shown in Fig. 1, a stop 13 is applied to a runway 11 at each end of a series of cards 12, with retaining noses 22 facing each other and projecting over the respective cards 12 at each end of the series. The lower edge of the bottom card and the upper edge of the top card abut against aligning bars 23 of the lower and upper stops 13, respectively, and are held against bars 23 by retaining noses 22 cooperating with central rib 14 of runway 11.

A stop 13 is applied to runway 11 by sliding it onto the runway from one end. In applying a stop to a runway, arms 25 are engaged under marginal flanges 15 with bars 23 and nose 22 engaged over the top of the runway. The resiliency of the wire with loops 24 provides for frictional engagement of the outer ends of bars 23 with the upper faces of flanges 15 while arms 25 have engagement with the under faces of flanges 15 to provide a frictional grip sufficient to retain the card stop in position on the runway in holding one end of a series of cards against longitudinal movement on the runway. A stop may be easily shifted by manually engaging the bars 23 and slidably moving the stop along the runway to a new position where it is resiliently retained against further movement by frictional engagement with the runway. It is easy to engage and disengage a card stop with one end of a series of cards for either holding them in position on a runway or providing for their convenient removal or transfer from one runway to another.

The invention claimed is:

A visible index comprising a card mounting runway formed of an elongated strip having an intermediate longitudinal rib and marginal flanges offset from said rib, a plurality of cards formed with attaching lugs on one marginal portion having inwardly extending ears on the free ends, said cards having said marginal portions of each engaged between the lugs and body of an adjacent card in offset overlapping visible index relation, said cards being slidably mounted on said runway in engagement with the outer face of said marginal flanges and said ears extending inwardly under said marginal flanges for slidably retaining said cards on said runway, and a card stop having transversely extending bar portions slidably engaging the outer face of said marginal flanges, arms mounted on opposite ends of said bar portions in transversely extending relation thereto and engaging the under sides of said marginal flanges, curved portions connecting said arms to the adjacent ends of said bar portions formed to extend from under said flanges about the free edges thereof and over the outer face of said flanges between said arms and bar portions, said arms and bar portions being formed to frictionally engage opposite faces of said marginal flanges for normally retaining said stop against movement on said runway, and means extending from said bar portions for engaging the outer face of an end card of a series on said runway, whereby said card stop will normally retain a group of cards having an end card engaged therewith against movement toward an end of the runway while said stop is manually adjustable along the runway to any desired position.

References Cited in the file of this patent

UNITED STATES PATENTS

| | | |
|---|---|---|
| 491,905 | Quortrup | Feb. 14, 1893 |
| 938,025 | Smoot | Oct. 26, 1909 |
| 957,423 | Klepfer | May 10, 1910 |
| 992,047 | Peak | May 9, 1911 |
| 2,635,607 | Gunn | Apr. 21, 1953 |